US006297817B1

United States Patent
Larson et al.

(10) Patent No.: US 6,297,817 B1
(45) Date of Patent: Oct. 2, 2001

(54) COMPUTER SYSTEM WITH MULTIPLE MONITOR CONTROL SIGNAL SYNCHRONIZATION APPARATUS AND METHOD

(75) Inventors: Michael K. Larson, Kirkland; Tom C. Martyn, Seattle, both of WA (US)

(73) Assignee: Appian Graphics Corp., Redmond, WA (US)

( * ) Notice: Subject to any disclaimer, the term of this patent is extended or adjusted under 35 U.S.C. 154(b) by 0 days.

(21) Appl. No.: 09/346,420

(22) Filed: Jul. 1, 1999

Related U.S. Application Data
(60) Provisional application No. 60/130,529, filed on Apr. 21, 1999.

(51) Int. Cl.[7] .................................................. G09G 5/00
(52) U.S. Cl. .......................................... 345/213; 345/1.1
(58) Field of Search ..................................... 345/213, 132, 345/1, 3, 5, 1.1, 3.1; 710/10, 15, 36; 712/1, 32

(56) References Cited

U.S. PATENT DOCUMENTS

| | | | |
|---|---|---|---|
| 4,965,559 | * 10/1990 | Dye | 340/717 |
| 5,488,385 | * 1/1996 | Singhal et al. | 345/3.1 |
| 5,694,141 | * 12/1997 | Chee | 345/153 |
| 5,848,294 | * 12/1998 | Clark | 710/36 |
| 5,943,064 | * 8/1999 | Hong | 345/132 |
| 5,949,437 | * 9/1999 | Clark | 345/502 |
| 6,049,316 | * 4/2000 | Nolan et al. | 345/213 |
| 6,181,300 | * 1/2001 | Poon et al. | 345/3.1 |

* cited by examiner

Primary Examiner—Richard Hjerpe
Assistant Examiner—Ronald Laneau
(74) Attorney, Agent, or Firm—Stoel Rives LLP

(57) ABSTRACT

A multi-monitor computer system (10) includes a configuration address space (40) for software driven initialization and configuration. A monitor synchronization method (50) of this invention includes temporarily remapping multiple graphics chips (14, 18) to a same base address (46) so that attempts to write to a memory mapped register on one of the graphics chips, also writes the same register on the other graphics chips. Once the addresses are remapped, writing chip enabling data to an enabling register on one of the graphics chips causes enabling data to be written to all graphics chips at the same time, thereby synchronizing the vertical and horizontal sync signals generated by the graphics chips. Finally, remapping the graphics chips to their original base memory addresses allows the computer system to resume selective addressing of the graphics chips, which now provide synchronized vertical and horizontal sync signals to their respective monitors.

13 Claims, 3 Drawing Sheets

COMPUTER SYSTEM WITH MULTIPLE MONITOR CONTROL SIGNAL SYNCHRONIZATION APPARATUS AND METHOD

RELATED APPLICATIONS

This application claims priority from U.S. Provisional Patent Application No. 60/130,529, filed Apr. 21, 1999, for COMPUTER SYSTEM WITH MULTIPLE MONITOR CONTROL SIGNAL SYNCHRONIZATION APPARATUS AND METHOD.

FEDERALLY SPONSORED RESEARCH OR DEVELOPMENT

Not Applicable

FIELD OF THE INVENTION

This invention relates to computer systems driving multiple display monitors and, in particular, to a method for synchronizing the monitors to eliminate the effects of electromagnetic interference coupled between the monitors.

BACKGROUND OF THE INVENTION

Many computer applications benefit from driving multiple display monitors from a single computer system. Such multiple monitor systems achieve greater display capability without the expense or inconvenience of a single, larger monitor. Consumers have demanded multi-monitor systems to more fully exploit the abilities of improved processors and the multi-tasking efficiency of new operating systems. Additionally, multi-monitor systems allow for enlarged display area as desired by professionals in the CAD, video editing, financial, and controls fields where multiple system components and parameters may have to be simultaneously monitored.

Implementing a multi-monitor computer system has been problematic because of preexisting industry standards developed in the single monitor display environment, in particular, the VGA display standard and the Peripheral Component Interconnect ("PCI") bus standard. Generally, a multi-monitor display system includes two or more monitors each driven by a graphics chip, a central processing unit ("CPU"), and a data bus for use in exchanging information between the CPU and the monitors/graphics chips. The VGA standard, which is implemented in many commercial graphics chips, was developed in the context of so-called legacy devices. Legacy devices are characterized in that they utilize their own unique resources such as memory address space, input/output ("I/O") address space, interrupt request lines and direct memory access ("DMA") channels. In this regard, VGA compatible graphics cards are mapped to predefined or dedicated resource spaces. For example, memory space may be mapped to hex addresses in the range a0000–dfff depending on the VGA mode and I/O space may be mapped to 3c0–3cf and either 3b4/3b5/3ba or 3d4/3d5/3da depending on the VGA mode. These mappings/resource usages are fixed per the VGA specification and cannot be changed.

Most commercially available graphics chips include a VGA compliant mode of operation. Such chips persist for a number of reasons including the continuing availability and use of VGA related devices and software written with the expectation that given legacy devices will use predefined resources. The VGA chips thus provide VGA compatibility for computer boot purposes, but may also implement extended non-VGA registers for various high-end features. These chips are nonetheless VGA compatible and are considered VGA devices.

Legacy devices may be contrasted with emerging non-legacy or so-called plug and play ("PNP") devices. PNP devices are characterized by the ability to be configured so as to utilize available resources. That is, PNP devices do not require predefined, dedicated address space for various resources. PNP technology involves a hardware implementation and related software or logic support. The hardware implementation allows PNP devices to have resource settings set electronically, i.e., without user set jumpers or switches. In addition, PNP hardware devices boot (start) in an unconfigured, turned off state. PNP software or logic support involves examining the system, determining what resources are available (not in use by another device), determining what resources the PNP hardware needs by querying the PNP hardware, setting up the PNP hardware to use those available resources and then turning on the PNP hardware.

The PCI bus standard is designed to accommodate PNP devices. To that end, the PCI specification provides for software driven initialization and configuration of PNP peripheral devices such as PCI cards. Generally, under the PCI protocol, the computer Basic Input/Output System (BIOS) scans the PCI bus, when the system is first turned on, to determine what resources each PCI device needs. The BIOS then assigns non-conflicting resources to each card, turns each card on, and initializes each card that may include an initialization routine in a card BIOS (VGA devices will include such a routine). Note that this initialization procedure may be repeated at a later time, for example, when a graphical user interface (GUI) operating system boots.

A problem arises when more than one legacy device of a particular type is implemented in a PCI system. The problem stems from the fact that legacy devices demand dedicated resources. Two legacy devices of the same type may therefore require access to the same memory space. Thus, upon initialization, if the system BIOS assigns the required resources to a first legacy device, the resources will be unavailable for the second legacy device. As a result, the system BIOS would be unable to turn on and initialize the second legacy device according to a conventional PCI resource allocation cycle. Software cannot use these legacy devices while they are turned off and not initialized.

A solution to the above-described problems is described in U.S. Pat. No. 5,848,294 for PCI COMPUTER SYSTEM WITH MULTIPLE LEGACY DEVICES, which is assigned to the assignee of this application and is incorporated herein by reference. The control subsystem described therein is implemented as software that alternately provides access to the system CPU by each of the monitors on an exclusive basis and at separate times on an as-needed basis. By virtue of the independence of the control subsystem from the monitors, VGA monitors can be run in a manner that mimics plug and play functionality, and the control subsystem can be made compatible with multiple legacy device types.

However, because the multiple monitors are driven from separate VGA chips that are, in turn, controlled by software operations occurring at unpredictable times, the monitors are typically not synchronized. That is, the vertical and/or horizontal sync signals driving the monitors do not occur at the same instants in time. Unfortunately, placing two or more unsynchronized monitors in close proximity to each other may cause their electromagnetic fields to interfere with each other, causing undesirable horizontal or vertical shading bars on at least one of the monitors. The conventional way of synchronizing monitors is by employing a commonly clocked, or hardwired, synchronization clock for all of the monitors. However, such a solution is not readily implemented in the above-described multiple display chip, multiple monitor configuration, and the problem is not limited to legacy monitor configurations.

SUMMARY OF THE INVENTION

It is an object of this invention, therefore, to provide a method and an apparatus for running multiple display monitors without mutual interference on a computer system without requiring specialized synchronization hardware.

It is another object of this invention to addresses the needs of consumers who already possess multiple monitors and desire to operate them without interference in a single computer system, or who otherwise desire the option of running multiple monitors without significant hardware upgrading.

According to one aspect of this invention, a computer system includes a PCI compliant I/O subsystem, at least first and second monitors associated with the PCI compliant I/O subsystem, and a control subsystem, independent of the monitors, for controlling operation of the first and second monitors such that they can operatively share particular resources of the computer system. Each of the monitors may be a VGA monitor driven by a VGA graphics chip. The control subsystem is preferably implemented as software for synchronizing the graphics chips and alternately providing exclusive access to the system CPU by each of the monitors at separate times on an as-needed basis. By virtue of the chip synchronization and independence of the control subsystem, multiple conventional monitors, such as VGA monitors, can be run without interference and in a manner that mimics plug and play functionality, making the control subsystem compatible with multiple monitors.

According to another aspect of this invention, the configuration space command register of the computer system is used to dynamically reconfigure the system during operating time, i.e., during and/or after booting. The PCI definition provides a configuration address space for software driven initialization and configuration. This configuration space has 256 byes of configuration registers including MemEnable and IOEnable bits. These bits allow the memory and I/O interfaces of the device to be turned off so that the device does not respond to any memory or I/O accesses. It has been recognized that these bits can be dynamically utilized to allow access to dedicated memory and I/O address spaces by not only one device at a time, but by remapping addresses, to all devices at the same time. The corresponding monitor synchronization method of this invention includes temporarily remapping the graphics chips to the same base address so that attempts to write to a memory mapped register on one of the graphics chips, also writes the same register on the other graphics chip or graphics chips. Once the addresses are remapped, writing chip enabling data to an enabling register on one of the graphics chips causes enabling data to be written to all graphics chips at the same time, thereby synchronizing the vertical and horizontal sync signals generated by the graphics chips. Finally, remapping the graphics chips to their original base memory addresses allows the computer system to resume selective addressing of the graphics chips, which now provide synchronized vertical and horizontal sync signals to their respective monitors.

According to a further aspect of this invention, back-to-back enabling of the graphics chips will approximately synchronize the chips, but may not completely eliminate the effects of electromagnetic coupling between their associated monitors. However, by adding a predetermined delay time between the graphic chip enabling commands, the vertical sync signals generated by the graphics chips are sufficiently synchronized so that interference causing dark horizontal bands will occur within the vertical blanking period of the affected monitor(s).

Additional objects and advantages of this invention will be apparent from the following detailed description of a preferred embodiment thereof that proceed with reference to the accompanying drawings.

DETAILED DESCRIPTION OF A PREFERRED EMBODIMENT

Figure 1:
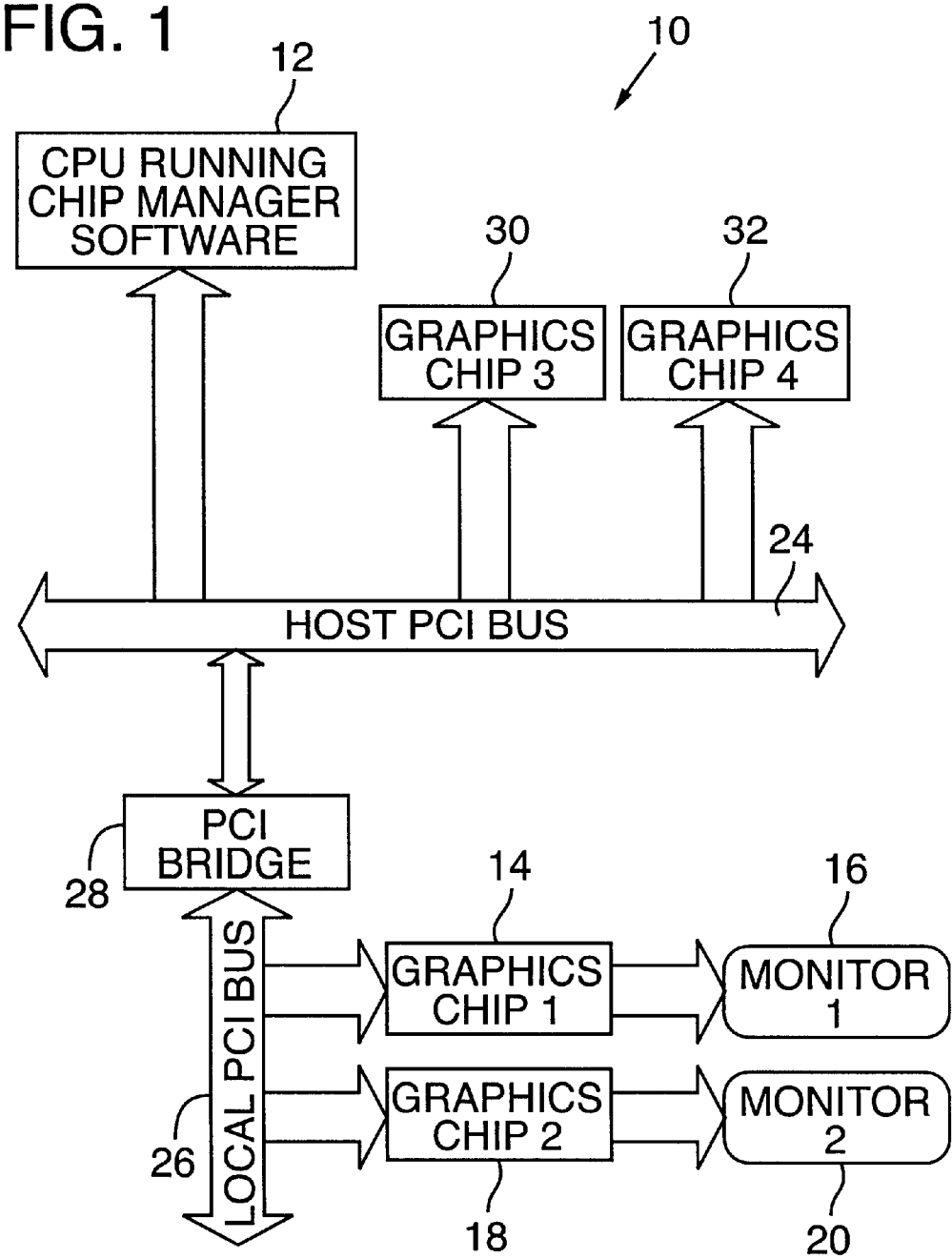
FIG. 1 is a schematic block diagram of a multiple monitor computer system suitable for use with this invention.

FIG. 1 shows a computer system 10 of this invention that includes a host computer CPU 12, a first graphics chip 14 associated with a first monitor 16, a second graphics chip 18 associated with a second monitor 20 and a chip manager application running on CPU 12. Computer system 10 also incorporates an I/O subsystem including a host PCI bus 24, a local PCI bus 26 connecting the peripheral devices, and a conventional PCI bridge 28 for interfacing PCI buses 24 and 26. Optionally and alternatively, additional graphics chips 30 and 32 may be connected directly to host PCI bus 24.

An important objective of the PCI specification is to provide a substantially hardware independent local bus architecture that supports PNP performance. This invention operates within this framework and it will therefore be understood that various devices and platforms can be utilized. The host computer of the illustrated embodiment includes a fully PCI compliant host bus 24 for providing access to the CPU 12, which may be, for example, a Pentium Processor manufactured by Intel Corporation.

The graphics chips 14 and 18 may be any of various commercially available chips, such as VGA compatible chips, which may include graphics accelerator functionality. In this regard, it will be appreciated that the chips may include non-VGA features in addition to the VGA booting compatibility functions. Each of the illustrated chips may comprise, for example, a model No. GD5434 chip manufactured by Cirrus Logic and may incorporate its own chip BIOS as well as 2MB of Dynamic Random Access Memory. Although computer system 10 is depicted as having four graphics chips including two identical VGA chips, it will be appreciated that more than four graphics chips or differing graphics chips may be utilized in accordance with the invention. Any compatible monitors 16 and 20 can be driven by the chips 14 and 18. The illustrated local bus 26 and bridge 28 are fully PCI compliant.

The discussion below refers to a number of functions performed by the chip manager program relating to graphics chip initialization, resource allocation, conflict avoidance, and related management functions. It will be understood that such functions can be implemented in various ways. In this regard, the functions are preferably compiled and run in the computer system 10 as object code. It will thus be appreciated that the chip manager logic is physically separate from and independent of the graphics chips 14 and 18.

To implement its management functions, the chip manager software uses the configuration space defined by the PCI specification. PCI compliant devices include a 256 byte configuration space for the primary purpose of configuring the device, and thereby support PNP type functionality. Under the PCI specification, the configuration space is accessible at all times, not just during the system boot, and is therefore available for use by the chip manager software.

Figure 2:
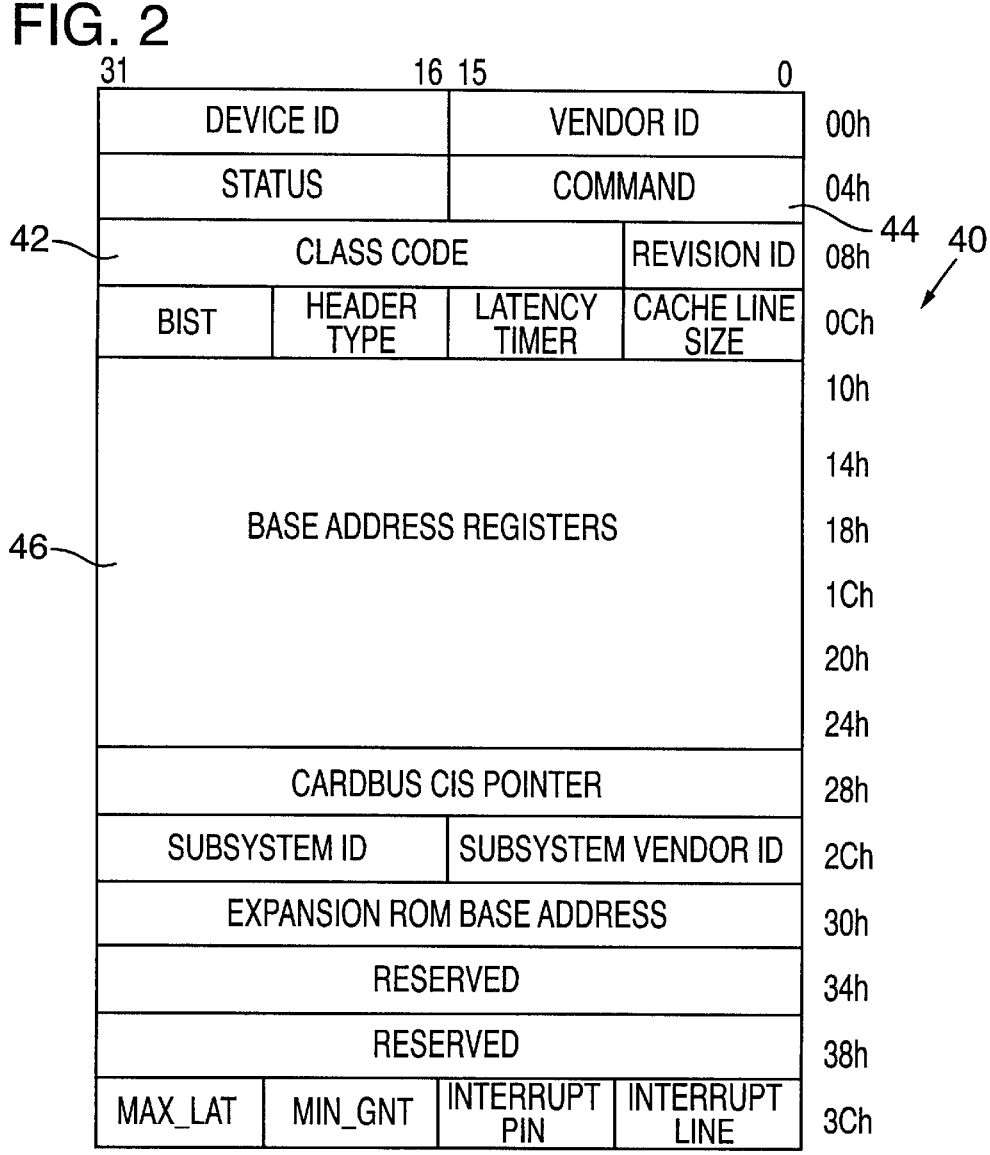
FIG. 2 is a table representing the lay-out of a header portion of a configuration space as defined by the PCI specification.

The configuration space includes a predefined header and a device dependent payload section. FIG. 2 shows the layout of the predefined header 40. Generally, the header registers support a number of functions that simplify system configuration. A complete description of the various function registers depicted is included in the PCI specification and will not be set forth here. However, a class code register 42, a command register 44, and a set of base address registers 46 are worthy of note.

Class code register 42 is a read only device used to identify the type of the device. It is broken into three byte size fields that identify, respectively, the broad class of function performed by the device, the more specific subclass of the device function, and the register level programming interface of the device. For example, the base class encoding, 03h, identifies a display controller. As will be understood from the description below, this function register can be used by the chip manager program to identify types of graphics chips for initialization and resource allocation.

Figure 3:
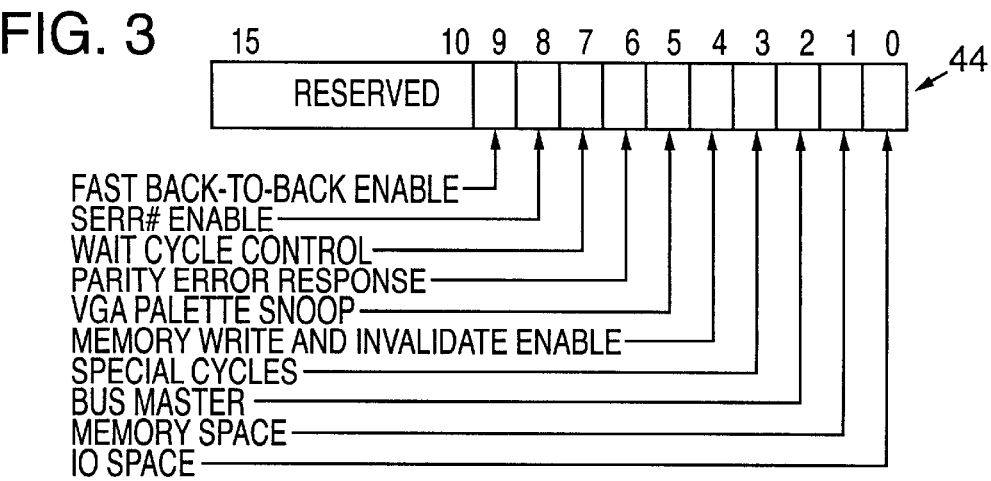
FIG. 3 is a table representing the lay-out of a command register portion of the header portion of FIG. 2.

Command register 44 generally provides control over a device's response to PCI cycles. FIG. 3 shows the general layout of the command register 44. Bit 0 controls the device's response to I/O space accesses. Bit 1 controls the device's response to memory space accesses. In either case, a logical value of 0 disables the device response, and a logical value of 1 enables the device response. During normal operation, the chip manager dynamically controls these bit values to allow only one legacy device of a particular type (where the type indicates that devices of the type may share resources that are predefined by the VGA standard) to access the related resources at a given time. That is, the chip manager software uses the configuration space to swap multiple legacy devices into and out of a single, dedicated memory and I/O map substantially without using additional logic or hardware.

The chip manager also addresses various types of problems in connection with implementing multiple graphics chip control in a computer system. Such problems include address decoding, chip initialization, and chip synchronization. Chip initialization and address decoding are adequately described in the incorporated by reference U.S. Pat. No. 5,848,294 and will not, therefore, be further discussed herein.

Chip synchronization is important for avoiding the effects of electromagnetic interference coupled between closely spaced apart monitors and/or their cabling in a multiple monitor configuration. A lack of synchronization may cause horizontal or vertical shading bars to appear on at least one of the monitors depending on the degree of electromagnetic coupling between monitors; their degree of non synchronization; and the type, synch rate, and shielding effectiveness of the monitors.

Figure 4:
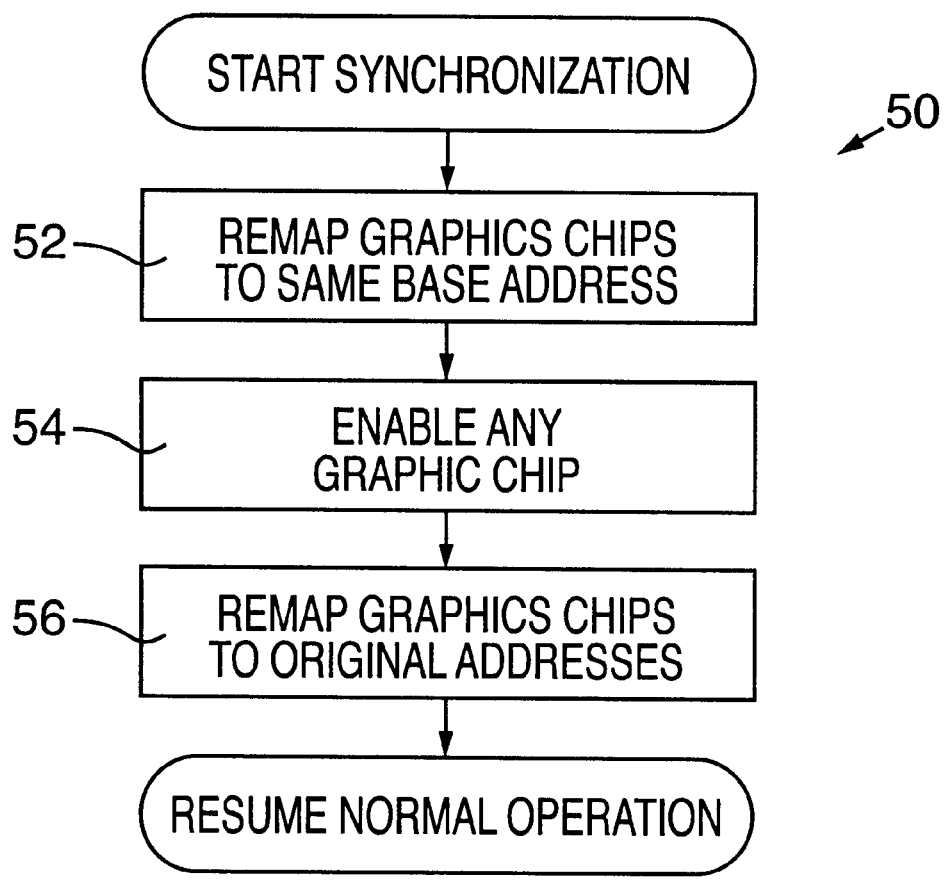
FIG. 4 is a block flow diagram representing a preferred multiple monitor synchronization method of this invention.

FIG. 4 shows a synchronization technique 50 of this invention for controlling multiple (in this example, two) VGA graphics chips to synchronously drive multiple monitors.

Also referring to FIGS. 1 and 2, a base address remapping block 52 represents temporarily remapping graphics chips 14 and 16 to the same base address in base address registers 46. This remapping causes attempts to write to a memory mapped register on one of graphics chips 14 and 16, to also write the same register on the other graphics chip or graphics chips.

A chip enabling block 54 represents writing chip enabling data to an enabling register on one of graphics chips 14 or 16. Because of the base address remapping, the enabling data are written to graphics chips 14 and 16 at the same time, thereby synchronizing the vertical and horizontal sync signals on generated by graphics chips 14 and 16.

Another base address remapping block 56 represents remapping graphics chips 14 and 16 to their original base memory addresses on base address registers 46 to resume selective addressing of graphics chips 14 and 16, which will now provide synchronized vertical and horizontal sync signals to monitors 16 and 20.

Graphic drawing is initiated by receiving a drawing command, for example, in a GUI operating system environment. Upon receiving the command, the chip manager determines whether the command is addressed to graphics chip 14 or graphics chip 18. In this example, graphics chip 14 is assumed to be the primary graphics chip as determined during initialization. If the command is addressed to monitor 16, the chip manager uses the configuration space 44 associated with graphics chip 14 to activate the chip if it is not already activated. Once graphics chip 14 has been activated, computer system 10 operates in normal manner to draw to monitor 16. The chip manager continues to monitor drawing operations throughout the process to determine whether the drawing is complete. In this regard, the chip manager will either receive additional drawing commands, or will eventually intercept a message indicating that drawing is complete, thereby ending the drawing operation. If a drawing command is addressed to a nonprimary monitor, i.e., monitor 20, the chip manager deactivates the graphics chip 14, and then uses the configuration space of graphics chip 18 to activate the chip as discussed above. Computer system 10 then proceeds to draw to monitor 20. Once the drawing command has been processed, the chip manager deactivates graphics chip 18 and reenables graphics chip 14. The chip manager then continues to monitor drawing commands until the drawing operation is complete.

Skilled workers will recognize that portions of this invention may be implemented differently from the implementations described above for a preferred embodiment. For example, the synchronization technique may be carried out during or following chip or system initialization processes, periodically during normal operation, or when switching control between graphics chips.

Back-to-back enabling of graphics chips 14 and 18 will approximately synchronize the chips, but may not completely eliminate the effects of electromagnetic coupling between monitors 16 and 20. However, by adding a predetermined delay time between the graphic chip enabling commands, the vertical sync signals generated by graphics chips 14 and 18 are sufficiently synchronized so that interference causing dark horizontal bands will occur within the vertical blanking period of the affected monitor(s).

This invention is effective for synchronizing closely spaced monitors driven by graphics chips associated with a single display adapter board having a common clocking source. If separately clocked multiple adapter boards are employed, a clock bridging cable or gen lock technique should be employed to synchronize the clocks on each board. Alternatively, monitors driven by one adapter board should be separate from or adequately shielded from monitors driven by another adapter board.

It will be obvious to those having skill in the art that many changes may be made to the details of the above-described embodiment of this invention without departing from the underlying principles thereof. The scope of this invention should, therefore, be determined only by the following claims.

We claim:

1. A method of synchronizing vertical and horizontal sync signals driving multiple displays driven from a single computer system: comprising:

interfacing multiple graphics chips to the single computer system;

temporarily remapping the multiple graphics chips to a same base memory address in the single computer system so that writing data to a memory mapped register on at least one of the multiple graphics chips causes the data to be written to the same memory mapped register on all of the graphics chips;

writing enabling data to a chip enabling register on at least one of the multiple graphics chips, thereby synchronously starting the vertical and horizontal sync signals on all of the graphics chips; and synchronously driving multiple monitors from associated ones of the multiple graphics chips.

2. The method of claim 1 further including remapping the multiple graphics chips to different base memory addresses to restore a selective addressing capability to the multiple memory chips.

3. The method if claim 1 in which synchronously driving multiple monitors eliminates a visible effect of electromagnetic coupling between the monitors.

4. The method of claim 1 in which the method is carried out during at least one of an initialization process, a repetitive time period, and a period of selectively addressing an alternate monitor.

5. The method of claim 1 in which the multiple graphics chips include a graphics accelerator functionality.

6. The method of claim 1 in which the multiple graphics chips are VGA compliant.

7. The method of claim 1 in which the computer system is PCI compliant.

8. A method of synchronizing sync signals driving first and second displays driven from a single computer system: comprising:

interfacing first and second graphics chips to the single computer system;

writing enabling data to a chip enabling register on the first graphics chip, thereby generating a first sync signal on the first graphics chip;

waiting a predetermined amount of time;

writing enabling data to a chip enabling register on the second graphics chip, thereby generating a second sync signal on the second graphics chip, the first and second sync signals being spaced apart by about the predetermined amount of time; and driving first and second monitors from associated ones of the first and second graphics chips.

9. The method of claim 8 in which the first and second sync signals are vertical sync signals.

10. The method of claim 8 in which the predetermined amount of time ranges from about 1 millisecond to about 33 milliseconds.

11. The method of claim 8 in which the predetermined amount of time is an amount of time that causes interference-causing electromagnetic radiation to occur within a vertical blanking period of an affected monitor.

12. The method of claim 8 in which the first and second graphics chips are VGA compliant.

13. The method of claim 8 in which the computer system is PCI compliant.

* * * * *